April 22, 1958 — T. E. WEICHSELBAUM — 2,831,252
HEMATOCRIT MEASURING INSTRUMENTS
Filed Oct. 7, 1955 — 3 Sheets-Sheet 1

INVENTOR.
THEODORE E. WEICHSELBAUM
BY *(signature)*
ATTORNEY

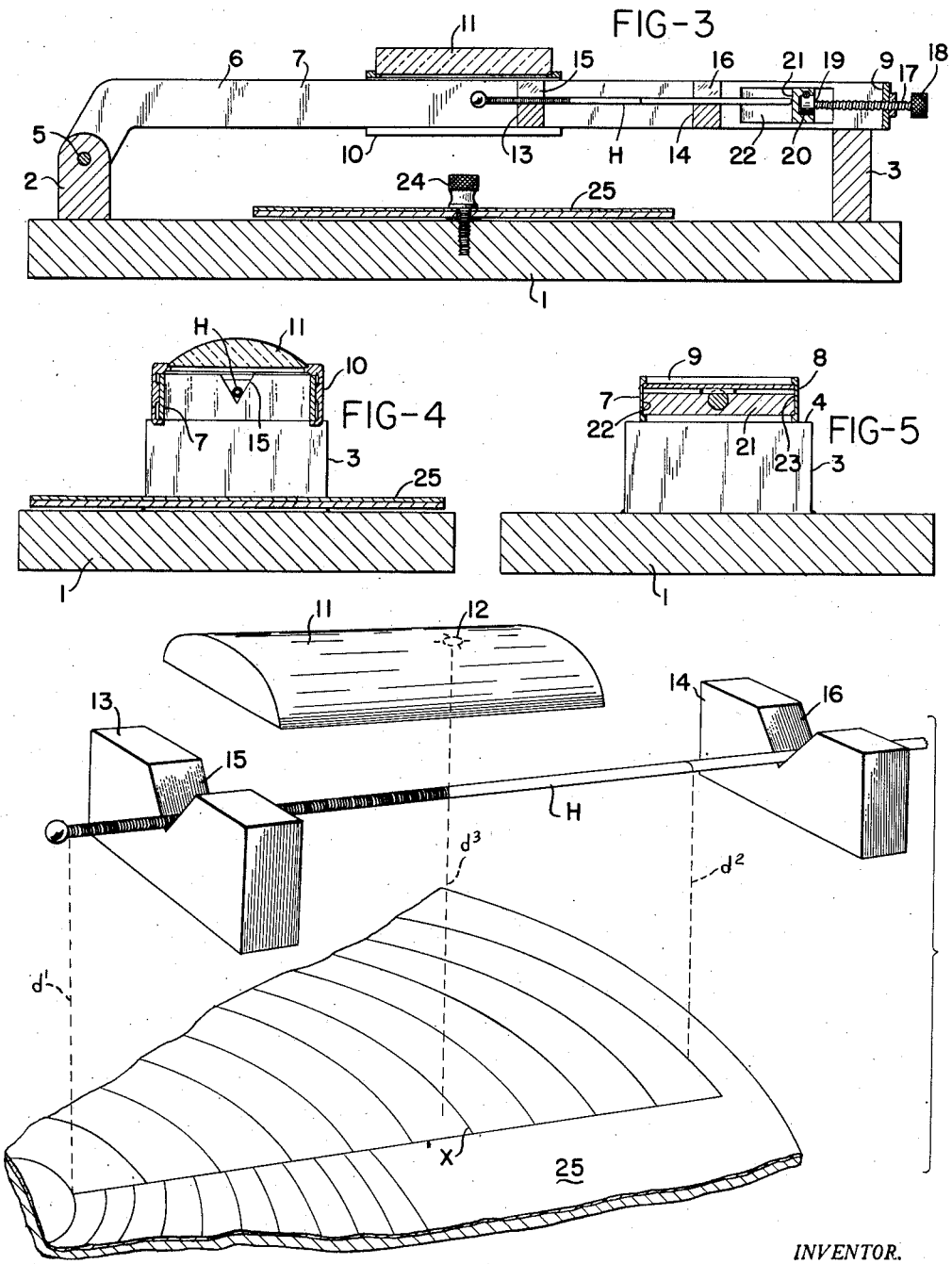

April 22, 1958  T. E. WEICHSELBAUM  2,831,252
HEMATOCRIT MEASURING INSTRUMENTS

Filed Oct. 7, 1955  3 Sheets-Sheet 3

INVENTOR.
THEODORE E. WEICHSELBAUM
ATTORNEY

United States Patent Office 2,831,252
Patented Apr. 22, 1958

2,831,252

HEMATOCRIT MEASURING INSTRUMENTS

Theodore E. Weichselbaum, Normandy, Mo.

Application October 7, 1955, Serial No. 539,197

7 Claims. (Cl. 33—125)

This invention relates in general to certain new and useful improvements in medical laboratory instruments and, more particularly, to an hematocrit measuring instrument.

In the course of medical diagnoses, it is frequently desirable to measure the relative amount of plasma and corpuscles in the blood of the patient. This is ordinarily accomplished by placing a sample of blood in a very small bore capillary tube or hematocrit, as it is usually called, together with suitable chemical reagents and centrifuging the tube or hematocrit so that the red corpuscles and the plasma will be segregated into separate measurable columns. Because of the very small quantities involved, it is virtually impossible to fill the capillary tube with some precisely known volume or quantity of blood sample. Therefore, the proportion between the red corpuscles and the plasma in the sample must be determined by measuring the combined and relative heights of the two columns and converting these measurements arithmetically into a proportion. At the present time, there is no convenient and accurate instrument available for reading hematocrits.

It is, therefore, the primary object of the present invention to provide an hematocrit measuring instrument with which it is possible to make accurate precise readings and determine the proportion between red corpuscles and plasma in a blood sample directly without arithmetical computation and without necessitating accurate initial measurement of the blood sample prior to centrifuging.

It is another object of the present invention to provide a device of the type stated in which the hematocrit can be placed and measured in a simple, speedy, and effective manner.

It is a further object of the present invention to provide a device of the type stated in which the hematocrit need not be moved once it is placed in position for measurement.

With the above and other objects in view, my invention resides in the novel features of form, construction, arrangement, and combination of parts presently described and pointed out in the claims.

In the accompanying drawings (three sheets):

Figure 1:
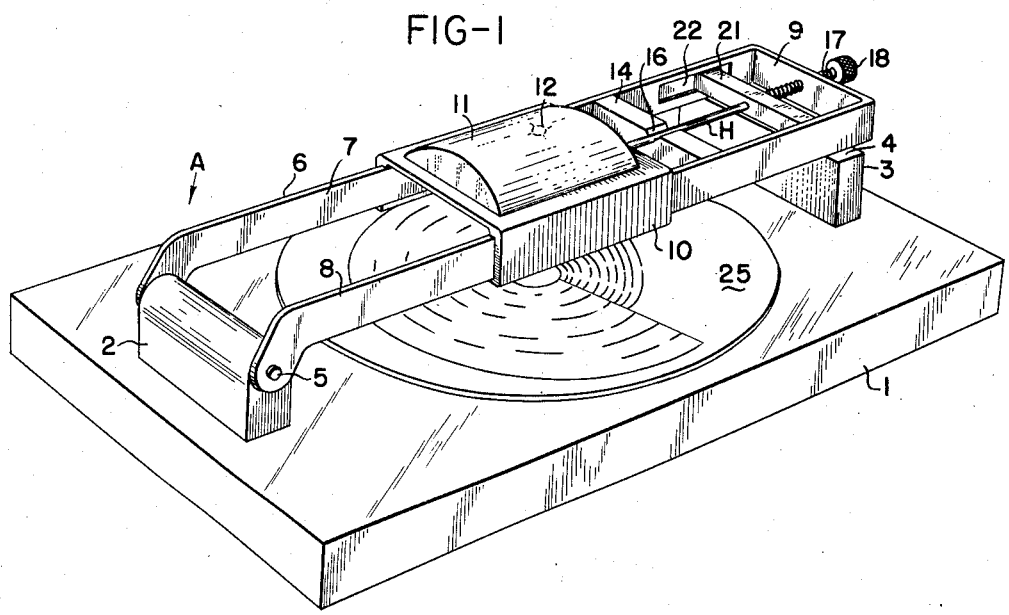
Figure 1 is a perspective view of an hematocrit measuring instrument constructed in accordance with and embodying the present invention.
Figure 2:
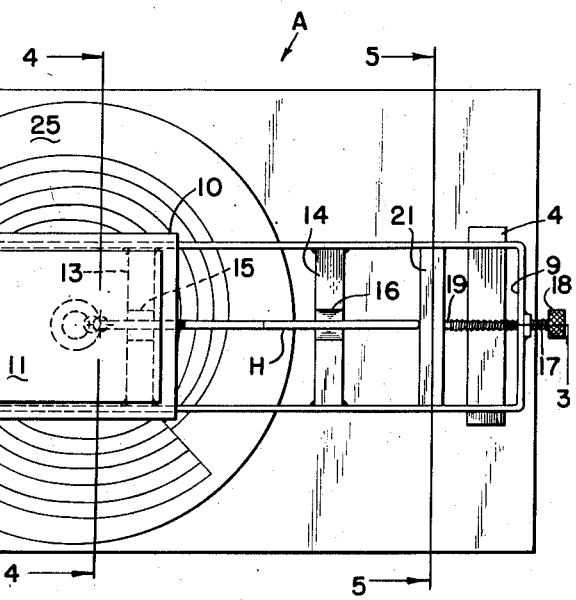
Figure 2 is a top plan view of the hematocrit measuring instrument shown in Figure 1.
Figure 6:
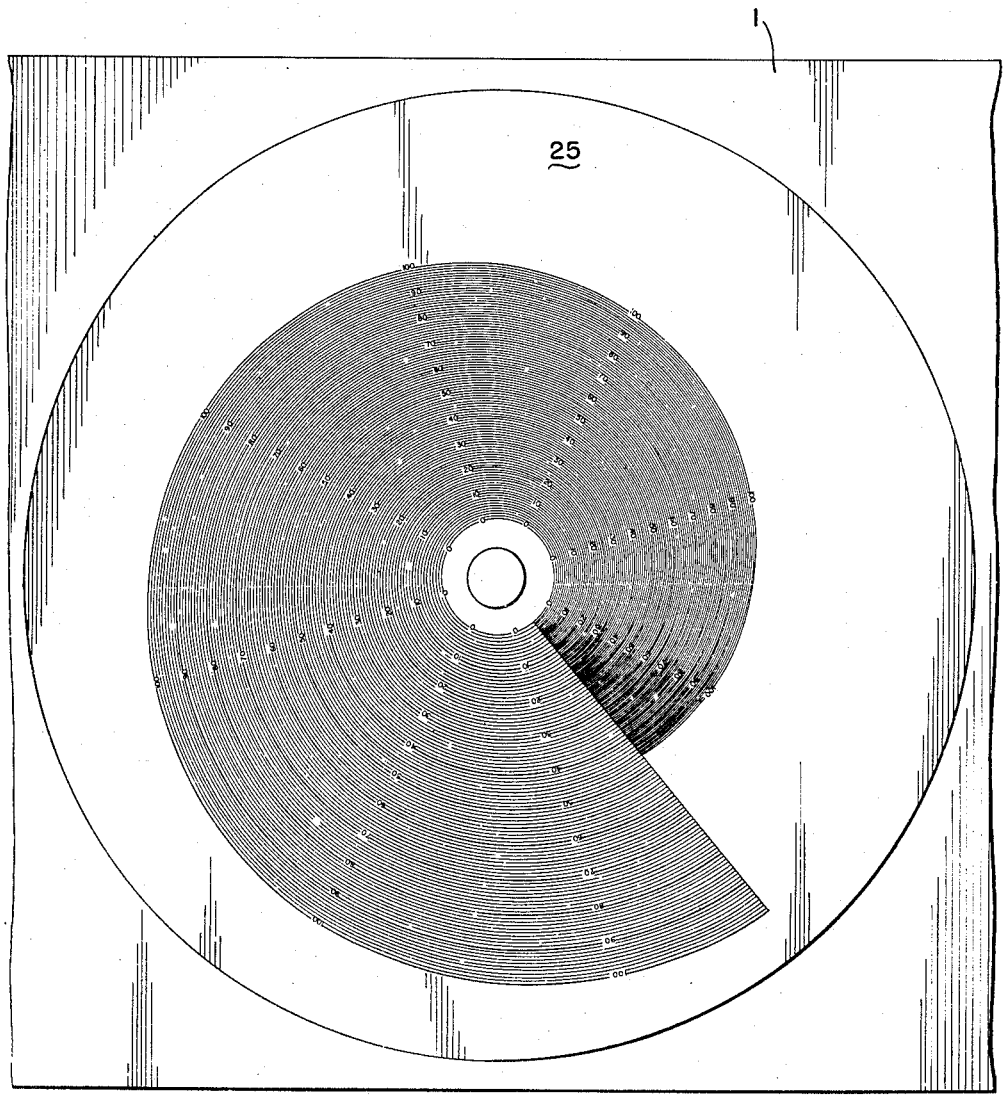

Figures 3, 4, and 5 are sectional views taken along lines 3—3, 4—4, and 5—5, respectively, of Figure 2;

Figure 6 is a plan view of the scale disk forming a part of the present invention; and Figure 7 is a fragmentary and exploded-perspective view of the hematocrit measuring instrument schematically showing the relationship of the various elements thereof as positioned for carrying out a measurement.

Referring now in more detail and by reference characters to the drawings, which illustrate a preferred embodiment of the present invention, A designates an hematocrit measuring instrument comprising a rectilinear base 1 provided upon its upper face with an upstanding hinge-forming block 2 and an upstanding shoulder 3, the latter being provided with an upwardly presented flat top face 4 which is substantially horizontal when the instrument A is in operative position. Swingably mounted on the hinge-forming block 2 by means of a pivot pin 5 is an elongated U-shaped frame 6 having opposed parallel legs 7, 8, connected at their outer ends by a transversely extending bight portion 9. Shiftably mounted upon the legs 7, 8, is a rectangular slide-frame 10 provided with a cylindrical lens or sight-glass 11, which is, in turn, centrally provided with collimating marks 12. Rigidly mounted at their ends upon, and extending transversely between the legs 7, 8, are two spaced parallel hematocrit supporting bars 13, 14, respectively provided with centrally positioned and lengthwise aligned V-shaped notches 15, 16, respectively, for receiving and supporting an hematocrit H, substantially as shown in Figures 3 and 4.

The bight portion 9 of the U-shaped frame 6 is centrally drilled and tapped for threadedly receiving an adjustment screw 17, the outer end of which is provided with a knurled knob 18. At its inner end, the adjustment screw 18 is integrally provided with a reduced-diameter shank 19 which is, in turn, provided with a ball-end 20 for rotative and retentive engagement within an adjustment block 21 disposed transversely between the legs 7, 8, of the U-shaped frame 6 and slidably seated at its opposite ends within lengthwise extending channels or grooves 22, 23, formed in the inwardly presented faces of the legs 7, 8, respectively, as best seen in Figure 5.

Rotatably mounted in more or less centered relation upon the upwardly presented face of the base 1, by means of a removable retainer pin 24 is a scale disk 25, which is inscribed on its upwardly presented face with an inner zero circle and ninety-nine spiral scale lines which are concentric with the zero circle. Preferably, every tenth spiral line is, for convenience, numbered so that the graduations will, in effect, read "0," "10," "20," "30," "40," "50," "60," "70," "80," "90," "100," substantially as shown in Figure 6.

In use, the hematocrit, after being centrifuged, is placed in the V-shaped notches 15, 16, and the slide-frame 10 shifted lengthwise along the frame 6 until the collimating marks 12 are more or less directly above a point on the circular zero line of the scale disk 25. Then, while sighting through the collimating marks 12, the user may shift the hematocrit lengthwise by use of the adjustment screw 17 and adjustment block 21 until the lowermost portion of the blood corpuscle column is directly in this vertical line of sight, as schematically indicated by the dotted line $d^1$ in Figure 7. Thereupon, the slide-frame 10 is then shifted outwardly until the collimating marks 12 are in line with the outer margin of the plasma column and the scale disk 25 is rotated until the outermost or "100" scale line is in coincidence with this vertical line of sight, as indicated by the dotted line $d^2$ in Figure 7. Finally, the slide-frame 10 is slid to an intermediate position in which the collimating marks 12 establish a vertical line of sight through the margin or inner face between the blood corpuscle column and plasma column, as indicated by the dotted line $d^3$ in Figure 7. The particular scale line $x$ lying within this line of sight $d^3$ can be visually observed and will give a direct reading as to the proportion of blood corpuscles and plasma in the sample. If, for instance, the scale line $x$ happens to be the 59th scale line, then the corpuscle ratio will be 59%.

It should be understood that changes and modifications in the form, construction, arrangement, and combination of the several parts of the hematocrit measuring instruments may be made and substituted for those herein shown and described without departing from the nature and principle of my invention.

Having thus described my invention, what I claim and desire to secure by Letters Patent is:

1. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a number of concentric scales arranged to provide a plurality of radially extending series of reference points, the reference points in each series being uniformly spaced but the spacing in each series being different from the spacing in every other series outwardly from the zero circle, and means for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit.

2. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a number of radially increasing concentric spiral scales arranged to provide a plurality of radially extending series of reference points, the reference points in each series being uniformly spaced but the spacing in each series being different from the spacing in every other series outwardly from the zero circle, and means for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit.

3. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a number of radially increasing concentric spiral scales arranged to provide a plurality of radially extending series of reference points, the reference points in each series being uniformly spaced but the spacing in each series being different from the spacing in every other series outwardly from the zero circle, a frame mounted in upwardly spaced parallel relation to the chart, and means carried by the frame for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit.

4. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a number of radially increasing concentric spiral scales arranged to provide a plurality of radially extending series of reference points, the reference points in each series being uniformly spaced but the spacing in each series being different from the spacing in every other series outwardly from the zero circle, a frame mounted upon the base for swingable movement about an axis substantially parallel to the base and being adapted normally to rest in upwardly spaced parallel relation to the chart, and means carried by the frame for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit.

5. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a number of radially increasing concentric spiral scales arranged to provide a plurality of radially extending series of reference points, the reference points in each series being uniformly spaced but the spacing in each series being different from the spacing in every other series outwardly from the zero circle, a frame mounted in upwardly spaced parallel relation to the chart, means carried by the frame for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit, and a magnifier slidably mounted upon the frame above said means.

6. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a plurality of radially extending series of reference points, the reference points in each series being uniformly spaced but the spacing in each series being different from the spacing in every other series outwardly from the zero circle, a frame mounted in upwardly spaced parallel relation to the chart, means carried by the frame for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit, and manually operable adjustment means operably mounted in the frame for shifting the hematocrit longitudinally within the frame.

7. A device for reading hematocrits in which a blood sample has been centrifuged so that the hematocrit will contain consecutive columns of corpuscles and serum defined by a bottom meniscus, an outer meniscus and an intermediate meniscus; said device comprising a base, a flat chart mounted on the base for rotation about a selected center-point, said chart having a zero circle concentric with the center-point and a plurality of radially extending series of reference points, the reference points in each series being uniformly spaced but the spacing in each series being different from the spacing in every other series outwardly from the zero circle, a frame mounted in upwardly spaced parallel relation to the chart, means carried by the frame for supporting a hematocrit with the bottom meniscus in alignment with the zero circle so that by rotating the chart until the outermost reference point in some selected series is aligned with the outer meniscus in the hematocrit, the intermediate meniscus of the hematocrit can be read in terms of a proportion between the columns in the hematocrit, a magnifier slidably mounted upon the frame above said means, and manually operable adjustment means operably mounted in the frame for shifting the hematocrit longitudinally within the frame.

References Cited in the file of this patent

UNITED STATES PATENTS

| | | |
|---|---|---|
| 7,961 | Nystrom | Mar. 4, 1851 |
| 962,035 | Mackoy | June 21, 1910 |
| 1,643,426 | Sutherland | Sept. 27, 1927 |
| 2,750,671 | Jones | June 19, 1956 |